Aug. 19, 1958
H. J. POLLARD ET AL
2,847,712
METHOD OF MOLDING RIBBED STRUCTURES FROM
THERMOSETTING RESIN AND FIBROUS MATERIAL
Filed Oct. 26, 1953
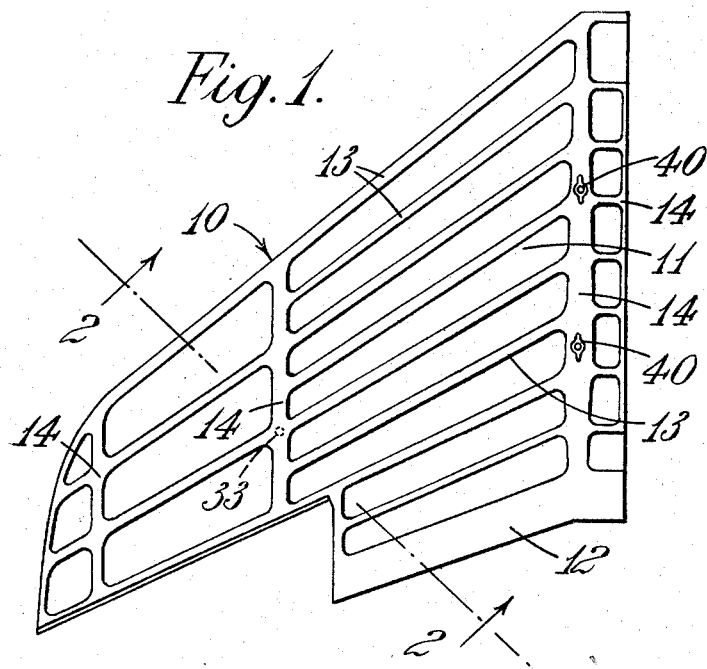
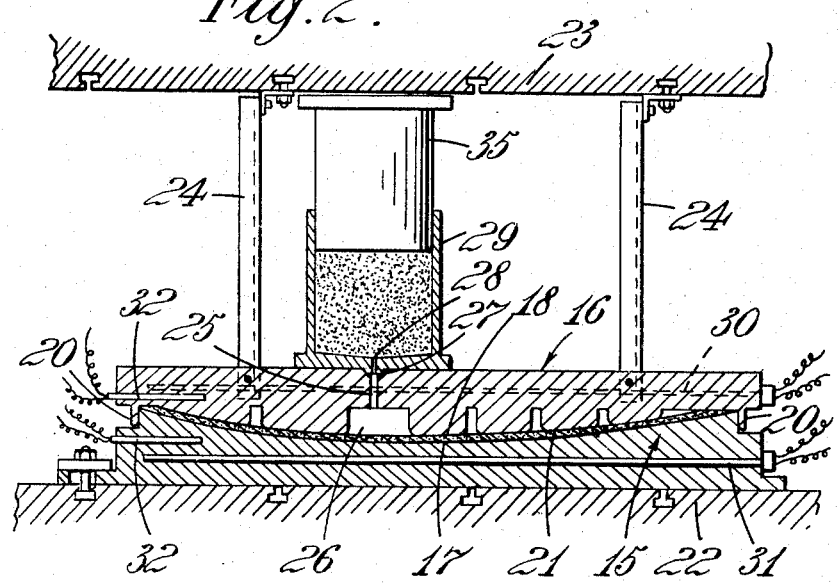

United States Patent Office 2,847,712
Patented Aug. 19, 1958

2,847,712

METHOD OF MOLDING RIBBED STRUCTURES FROM THERMOSETTING RESIN AND FIBROUS MATERIAL

Harold John Pollard and John Rees, Bristol, England, assignors, by mesne assignments, to Bristol Aircraft Limited, Bristol, England, a British company Application October 26, 1953, Serial No. 388,181

Claims priority, application Great Britain November 10, 1952

4 claims. (Cl. 18—55)

In the technique of making mouldings from fibrous material and thermosetting resin, for example asbestos fibre impregnated with water-soluble phenol-formeldehyde resin, it is known that the curing of the resin must either be effected at a pressure sufficiently high to maintain the water, which is formed during the process of condensation, in the liquid state, or else special provision must be made for the removal of the water vapour during the curing process.

For the manufacture of medium sized mouldings on a quantity production basis and to close dimensional tolerances the high pressure technique is much to be preferred on account of its greater simplicity, accuracy and suitability for operation by semi-skilled labour, but it has been found that the strength of the mouldings produced is often disappointing as compared with that of the basic material cured under laboratory conditions.

In the production of practical components the shape of the component is rarely such that a simple pressure mould can be made which will guarantee the attainment of even approximately equal pressures throughout the component when the mould is closed under pressure unless the material charged into the mould is of such a nature that appreciable flow can take place. The impregnated fibre material required to provide the desired strength and other properties in these components contains a high proportion of felted or woven fibre and is not capable of flowing in this manner except by the tearing or disruption of the individual fibres. It may be assumed in fact that in certain parts of the mould there will be excessive crushing forces from opposite sides which can only have the effect of causing the individual fibres to cut into one another at the places where they cross and this, together with the general outward flow from such parts, must result in substantial damage to the fibrous structure of the material. Moeover it is also probable that in adjacent areas insufficient pressure will be generated to prevent the formation of steam pockets with the attendant loss of homogeneity of the product.

The object of the present invention is to provide an improved method of making mouldings from fibrous material and thermosetting resin in which the difficulties discussed above are substantially reduced or overcome.

According to the present invention, the method comprises placing some fibrous material in a mould cavity formed between a plurality of mould parts so that at least a part of the mould cavity adjacent the moulding face of at least a portion of one of the mould parts is occupied by the fibrous material, the fibrous material placed in the cavity being pliant and in a woven or felted form and impregnated with a thermosetting resin; closing the mould parts tofether; injecting under pressure into the mould cavity through one or more inlets a liquid material comprising a thermosetting resin; raising the temperature of the mould to a temperature sufficient to promote curing of the thermosetting resin in the mould cavity; maintaining this temperature, and the injection pressure for a period sufficient fully to cure the resin, the injection pressure being such as to ensure the existence within all parts of the mould cavity of a pressure in excess of the vapour pressure of water at the curing temperature; and then cooling the mould to a temperature below the boiling point of water at atmospheric pressure before removing the moulding from the mould.

In the method defined above the injected material acts as an hydraulic pressure fluid to produce an internal moulding pressure in the mould which acts substantially equally around each individual fibre. By injecting a liquid material therefore the usual mechanical moulding pressure (i. e. a pressure obtained by forcibly closing the mould parts together) can be totally or partially replaced by pressure transmitted hydraulically into the mould cavity. Since the injection pressure is maintained above the vapour pressure of water at the curing temperature, the water formed from the resin as the resin is cured is unable to vapourise.

Although it is possible totally to replace with hydraulic pressure mechanical moulding pressure produced by forcible closing of the mould, as is advantageous in moulding hollow bodies or other components in which parts of the wall of the body or component lie at an acute angle to the closing direction of the mould parts so that very little pressure can be exerted upon these parts by forcible closing of the mould, according to a feature of the present invention, the fibrous material which is placed in the mould cavity may be in thickness such that when the mould parts are closed together that part of the mould cavity occupied by the material is packed with the material as tightly as is practicable without distortion of the material sufficient to disrupt its fibres.

In this way the moulding pressure may be achieved partly by mechanical pressure and partly by hydraulic pressure within the mould cavity.

According to another feature of the invention the fibrous material may be so placed in the mould cavity that prior to injection of the liquid material, the moulding face of one of the mould parts is lined with said fibrous material while at least one space remains within the mould cavity between the fibrous material and the moulding face of the other mould part or parts, which space communicates with said inlet or one of said inlets.

It is to be understood that the injected material flows into and completely fills the space or spaces left in the mould cavity, the injection pressure, and the mobility of the injected material being so adjusted as to ensure that this will happen.

Prefereably, the injected material comprises a mixture of the thermosetting resin and fibrous material of mineral, organic or synthetic origin. The fibrous material placed within the mould cavity may also be of mineral, organic or synthetic origin.

The present invention is particularly applicable to the moulding of components having a sheet-form part with one or more protuberances for example stiffening members such as ribs and spars, on one or both sides. For producing a moulding of this kind from fibrous material and thermosetting resin the present invention provides a method which comprises placing some fibrous material in a mould cavity for the component formed by a pair of mould parts, so as to pack that portion of the mould cavity corresponding to the sheet-form part of the component, the fibrous material which is so placed being pliant, and in a woven or felted form and impregnated with a thermosetting resin, and being in thickness such that when the mould parts are closed together that part of the cavity corresponding to the sheet-form part of the component is packed as tightly as is practicable without disruption of the fibres of the fibrous material; closing the mould parts together; injecting under pressure through an inlet leading to that portion of the mould cavity corresponding to said stiffening rib, boss or other protuberance, a liquid material comprising a fluid mixture of a thermosetting resin and fibrous material, the injection pressure being such as to ensure the penetration of said mixture to all unoccupied parts of the mould cavity; raising the temperature of the mould to a temperature sufficient to promote curing of the thermosetting resin in the mould cavity; maintaining this temperature and said injection pressure for a period sufficient fully to cure the resin, the injection pressure also being such as to ensure the existence within all parts of the mould cavity of a pressure in excess of the vapour pressure of water at the curing temperature, and then cooling the mould to a temperature below the boiling point of water at atmospheric pressure before removing the component from the mould.

In order that the present invention may be more clearly understood a specific method in accordance with the invention will now be described by way of example. The method will be described with reference to the production of an aircraft wing panel of the kind described in the specification accompanying patent application Serial No. 348,272, filed April 13, 1953 and now abandoned, with reference to Figures 1 and 2 of the drawings thereof.

In the accompanying drawings:

Figure 1 is a plan view of the wing panel, and

Figure 2 is a somewhat diagrammatic partial cross-section of an apparatus for carrying out the method which is about to be described.

Referring to Figure 1, the panel which is generally indicated at 10 comprises a dished sheet-form part 11 which is thickened as at 12 at its trailing edge to form a flat surface. The panel 10 also comprises a number of integrally moulded spanwise extending spars 13 and cordwise extending ribs 14, the spars 13 and the ribs 14 form stiffening members for the sheet-form part 11 of the panel 10.

Referring to Figure 2, the panel 10 is produced in a mould cavity corresponding to the shape of the panel, the cavity being formed by a pair of mould parts generally indicated at 15 and 16.

In Figure 2 it is to be understood that the mould cavity, which is shown in cross-section on a line corresponding to the line 2—2 in Figure 1 is drawn to a larger size than Figure 1 for the sake of clarity.

The lower mould part 15, has a moulding face 17 corresponding to the outer surface of the sheet-form part 11, and the upper mould part 16, has a moulding face 18 corresponding to the form of the thickened portion 12, the spars 13, the ribs 14 and the inner surface of the sheet-form part 11. The upper part 16 of the mould is provided with a depending peripheral flange 20 which guides the lower part 15 of the mould when the mould parts are closed together.

Hitherto in carrying out the high pressure moulding techniques for the production of components from fibrous material and thermosetting resin it has been necessary to make the mould parts 15, 16 of steel due to the existence of high local pressures set up on forcibly closing the mould halves together with a force sufficient to provide the required moulding pressure.

With a method according to the present invention, however, high local pressures during moulding are substantially eliminated, and it has been found that the mould parts such as 15, 16 in the example now being given may be made of zinc or other easily cast and comparatively soft metal. This represents a substantial economy which may be effected when carrying out the present invention.

The lower part 15 of the mould is supported on and bolted to the lower platen 22 of a press, and the upper part 16 of the mould is initially supported from the upper platen 23 of the press by means of struts 24.

At a position near the centre of the mould part 16 and communicating with the portion 26 of the mould cavity corresponding to the intersection of a spar 13 and a rib 14, an inlet 25 is provided leading from the cavity portion 26 to the upper surface of the mould part 16 where it is counterbored as at 27 to receive a locating boss surrounding the outlet 28 of an injection cylinder 29 mounted upon the mould part 16 as hereinafter described. The position of the inlet 25 in relation to the whole mould cavity is shown by the chain dot circle 33 in Figure 1.

In order to produce the panel 10, felts of asbestos fibre approximately 0.085 inch thick and impregnated with a partially cured water-soluble phenolformaldehyde resin in a pliant condition are first precompressed between flat platens at a pressure of about 150 pounds per square inch. By "pliant condition" is meant a condition in which felts are hard to the touch but may be bent with the fingers to a radius of about 0.5 inch without evidence of cracking. If the felts are too hard, owing for example to storage in a dry atmosphere, they may be rendered pliant as defined above by wiping with a cloth damped with water. Excessive damping with water is, however, to be avoided.

After precompression of the felt, the felts are cut to size and laid in order on a jig corresponding to the sheet-form part 11, the felts being arranged and interleaved to give the desired fibre distribution, that is to say, felts are employed in which the fibres run principally in one direction, and the felts are arranged upon the jig so that the direction of their fibres is most favourable for resisting the anticipated stresses in the finished wing panel during use. While the felts are being arranged on the jig any desired metal inserts may be interleaved with the felts. These inserts may be in the form of plates or sheets with or without perforations, or they may be in the form of a mesh. Where multiple layers of these inserts are desired they are interleaved with the felts so that the whole becomes bonded together during the curing process which is hereinafter described. The moulding faces of the mould parts 15 and 16 are meanwhile treated with a suitable parting agent and the prepared assembly of cut felts is then transferred from the jig to the moulding face 17 as shown at 21 in Figure 2. In order that the felts may be placed in the mould cavity the upper platen 23 of the press is raised, the platen 23 thereby lifting the mould part 16 through the struts 24.

After the felts have been placed in the mould cavity the mould parts 15, 16 are closed together by lowering the upper platen 23.

The thickness of the felts transferred from the jig is made such that the degree of filling of the mould cavity corresponding to the sheet-form part 11 of the panel 10 is sufficient to pack this part of the mould cavity with the felts nipped between the moulding faces 17, 18 as shown in Figure 2 but is not such that the felts would be compressed to an extent sufficient to force the felts into the unoccupied parts of the mould cavity corresponding to the spars 13, the ribs 14 and the thickened edge portion 12. In this manner it is assured that the felts are packed as tightly as is practicable without distortion sufficient to disrupt their fibres.

The injection cylinder 29 is then charged with a mixture of water-soluble phenol-formaldehyde resin and asbestos fibre in the form of flock which is dry at ambient temperature, the resin constituting from 50% to 70% by weight of the mixture, and the injection cylinder is placed on the upper surface of the mould part 16 as shown in Figure 2 with its locating boss surrounding outlet 28 positioned in the counterbored mouth 27 of the inlet 25.

The temperature of the mould parts 15, 16 and of the injection cylinder 29 is then raised to 140° C. (a temperature sufficient to promote curing of all the thermosetting resin in the mould cavity) by means of electrical heating elements 30, 31 enclosed respectively in the mould parts. In order to measure the temperature of the mould parts thermo-couples 32 are provided.

The mould parts 15, 16 and the injection cylinder 29 are raised to the required temperature over a period of about 40 minutes and are then maintained at this temperature for a period of about 20 minutes. Somewhat before the required temperature of 140° C. is attained the struts 24 are removed and the upper platen 23 lowered on the ram 35 of the injection cylinder to inject the mixture in the injection cylinder, which has, in the meantime, become a liquid mixture due to the increased temperature, into the mould cavity through the inlet 25 at a pressure which may rise to 4000 pounds per square inch.

The combined effect of this pressure, and the elevated temperature of the mould parts 15, 16, which increases the mobility of the injected material, causes the injected material to flow into the mould cavity and fill all the remaining spaces therein corresponding to the spars 13, the ribs 14 and the thickened edge portion 12, and to create an internal hydraulic pressure in the mould cavity such as will prevent the vaporisation of the water formed from the phenol-formaldehyde resin as it is cured.

As the injection of the material in the injection cylinder 29 proceeds, the air in the unoccupied portions of the mould cavity escapes from the mould between the joined faces of its upper and lower parts 15, 16. The escaped air is followed by a flash leakage of the injected material, but this soon ceases as the material stiffens due to its curing.

At the end of the curing period of 20 minutes mentioned above, the electric supply to the heating elements 30, 31 is switched off and the mould allowed to cool to below 90° C. The platen 23 is then raised and the injection cylinder 29 removed. The struts 24 are then put back so that the mould part 16 may be raised by the upper platen 23, the finished panel being thereafter removed from the mould.

If it is desired to have inserted metal reinforcements in one of the ribs 14 as indicated at 40 in Figure 1, these are arranged upon the felts filling the sheet-form part of the mould cavity so that they enter into the part of the mould cavity in the upper mould part corresponding to the rib in which the metal reinforcement is to be moulded. During injection of the material from the cylinder 29 these reinforcements are encased in the injected material and are thereby moulded into the rib.

At the conclusion of the moulding process it is of course sufficient merely to cool the mould below the boiling point of water at atmospheric pressure before opening the mould. In the example given above a temperature of 90° C. (as measured by the thermocouples 32) is employed to give an adequate safety margin since the thermo-couples cannot be relied on to indicate when all parts of the moulding assemblage have cooled exactly to 100° C.

As the resin in the mould cavity is cured, the internal pressure in the mould cavity gradually disappears in the hydraulic sense, and at the conclusion of the moulding process it is immaterial when the pressure on the ram 35 is relieved. In the example given, it is necessary to cool the mould before the pressure on the ram is relieved, however, because the ram pressure holds the mould parts 15, 16 together and prevents disruption of the moulded material by the vaporisation of the water formed from the resin while the temperature is above 100° C. The mould parts 15, 16 could, however, be clamped with bolts after they have been closed together, in which case the pressure on the ram 35 could be relieved before the mould is cooled.

Depending upon the properties of the injection material, the injection may take place before, during or after the heating of the mould, and therefore the injection cylinder, to the curing temperature, provided however that if injection starts after the curing temperature has been reached, the delay is not sufficient to allow the resin already in the mould cavity or the resin in the injection cylinder to become too stiff due to curing before the injection is properly completed.

Injection may take place before the temperature of the mould or the injection cylinder is elevated at all, provided that the material to be injected is in a liquid state at ambient temperature and sufficiently mobile to penetrate into all the unoccupied parts of the mould cavity under the injection pressure, and also provided that the flash leakage is not so great as to allow too much of the injected material to escape before it stiffens.

It is, however, preferred to elevate the temperature of the mould at least to the region of the curing temperature before injection is commenced, because, as previously stated, the elevated temperature of the mould parts increases the mobility of the injection material which is an advantage when its flow path in the mould cavity is tortuous or otherwise restricted at certain places.

Finally, it is to be understood that two or more injection cylinders could be used to inject material at different points in the mould cavity, and that it is not necessary to have spaces in the mould cavity unoccupied by the impregnated felted or woven material placed in the cavity before the mould parts are closed together.

We claim:

1. A method of moulding a component having a stiffening rib system on at least one side of a sheet-form part, consisting of overfilling with fibrous material fully impregnated with a thermosetting resin that part of the cavity of an openable mould for moulding the component which corresponds to the sheet-form part, the rib system part of the mould being left empty and the overfilling being such that when the mould is closed the fibrous material is compressed but not caused to flow from one part of the mould to another, closing the mould, injecting into the empty parts of the mould a mixture of fibrous material and thermosetting resin, raising the temperature to cure the resin and maintaining during curing an injection pressure sufficient to contain any volatiles produced during curing.

2. A method as claimed in claim 1 wherein the fibrous material for the sheet-form part is laminated and partly pre-cured.

3. A method as claimed in claim 1 wherein the step of raising the temperature to the curing level is performed before starting the injecting step.

4. A method as claimed in claim 1 wherein the step of raising the temperature to the curing level is performed after starting the injecting step.

References Cited in the file of this patent

UNITED STATES PATENTS

| | | |
|---|---|---|
| 1,997,074 | Novotny | Apr. 9, 1935 |
| 2,183,857 | Turkington | Dec. 19, 1939 |
| 2,279,208 | Shaw | Apr. 7, 1942 |
| 2,495,640 | Muskat | Jan. 24, 1950 |
| 2,646,380 | Barlow et al. | July 21, 1953 |